Patented July 19, 1949

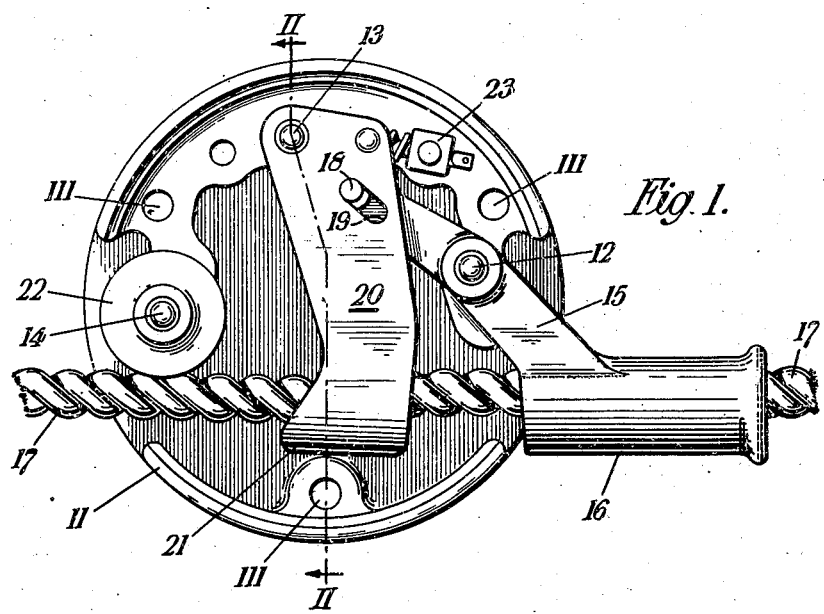
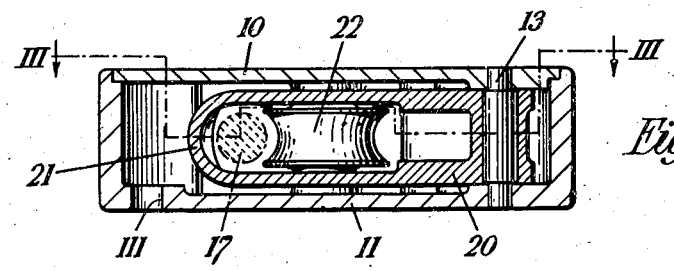
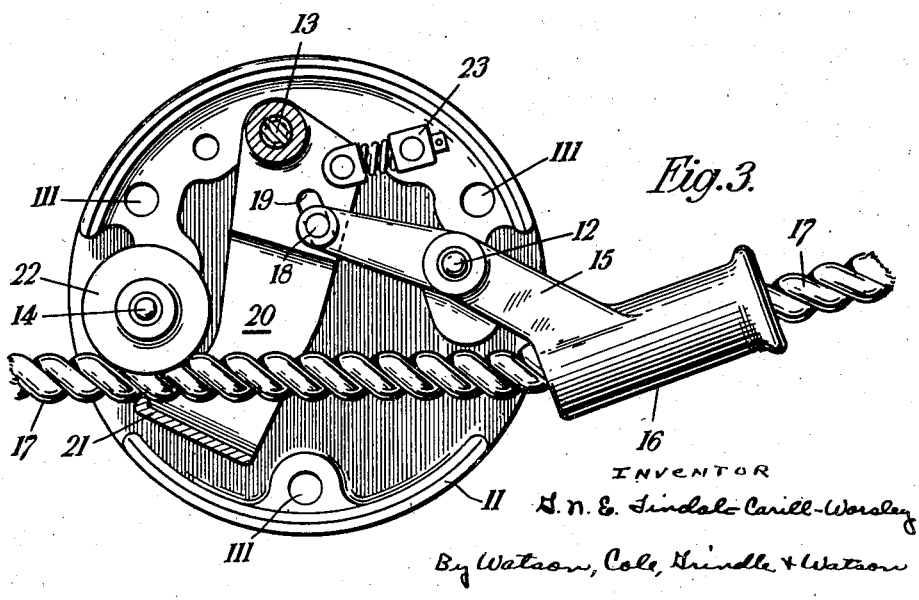

2,476,393

UNITED STATES PATENT OFFICE 2,476,393

LOCKING CLEAT FOR SECURING ROPES AND THE LIKE

Geoffrey Nicolas Ernest Tindal-Carill-Worsley, Walton-on-Thames, England, assignor of one-half to Screw Machine Products Limited, Wooburn Green, near High Wycombe, Buckinghamshire, England Application November 14, 1946, Serial No. 709,827
In Great Britain October 21, 1946

2 Claims. (Cl. 24—133)

The object of this invention is to provide an improved locking cleat for use in securing a rope, cable or the like in a desired position under an applied load, e. g. in holding taut the sheet of a sailing-boat, it being particularly desirable that the locking and unlocking action of the cleat should be capable of being operated from a remote position, that it should not damage the rope or the like, and that there should be incorporated some automatic means of retaining the mechanism in the locked and unlocked positions.

A locking cleat in accordance with the invention comprises an operating lever and a locking lever pivotally mounted in a suitable frame at spaced positions, an abutment fixed adjacent the locking lever, a mechanical connection between said levers such that pivotal movement of one is transmitted in the opposite sense of angular movement to the other, and a fairlead on the operating lever, the arrangement being such that a rope or the like passed through said fairlead may be gripped between the locking lever and said abutment by imparting a pivotal movement to the operating lever, and released by an opposite pivotal movement of the latter, such pivotal movements of the operating lever being effected e. g. by pulling upon the free end of the rope or the like in such manner as to exert a lateral pull on the fairlead in the requisite direction.

The fixed abutment may be constituted by a small pulley rotatable on a fixed axis in the frame, so as to permit the free run of the rope when the locking means is released. The locking lever is preferably so formed at its free end, at which, when moved to the locking position, it bears against the rope passing over said pulley, as to hold the rope positively against movement in the direction opposite to that in which it has been tightened. Conveniently the locking lever is of duplex form, being made so that its free extremity is looped to partially enclose the rope; furthermore, the part of the loop of said lever which engages the rope when locked is made with an inturned edge or rim by which the rope is nipped against the surface of the pulley.

A particular embodiment of the invention, as applied to a cleat for locking the sheet of a sailing boat, will now be described with reference to the accompanying drawings. In said drawings, Fig. 1 is a plan of the cleat shown in the free or unlocked position, with the cover removed, Fig. 2 is a section taken on the line II—II of Fig. 1, and Fig. 3 is a section on the line III—III of Fig. 2, showing the positions of the parts in the locked condition.

The device comprises a frame composed of two flat parallel plates 10, 11, spaced apart and mounted on studs 12, 13, 14 which serve as pivots for the operating and locking levers and the pulley abutment respectively, which members are housed between said plates 10, 11. The plate 11 is drilled at 111, 111, in order that the device may be attached to the structure of the boat. The operating lever 15 is pivoted at an intermediate point on the stud 12, one arm of the lever carrying the fairlead 16 through which the rope 17 is passed and the other arm carrying a pin 18 which works in slots 19, formed in the locking lever 20 at a point thereon between its pivot 13 and the locking loop 21 at its free end. The action of pivoting the operating lever 15 in an anti-clockwise direction as viewed in Figs. 1 and 3 results in the pin 18 imparting to the locking lever 20 a clockwise pivotal movement (Fig. 3), bringing its locking loop 21 into bearing contact upon the rope 17 at the point were it passes over the pulley 22 which constitutes the fixed abutment of the lock. The arrangement of the parts is such that tension on the rope 17 operates to exert an even tighter locking grip of the locking lever 20 thereon, whilst the same effect is attained by an increased strain on the operating lever 15 by an intensified lateral pull on the free end of the rope.

It is convenient that the operating and locking levers 15, 20 should be so geared together that a small degree of angular movement of the former produces a considerably greater degree of angular movement of the latter. In a preferred embodiment this ratio may be as 1:3.

The device may be operated to lock or release the rope from a position remote from that at which the locking cleat is mounted, it being merely necessary for the free end of the rope to be of sufficient length to reach from the cleat to the remote position. As will be understood, the locking and releasing operations are effected by pulling the free end of the rope laterally to either side, where the cleat is mounted with the lever pivots vertical, or upwardly and downwardly where the lever pivots are horizontal.

In order to provide automatic means for positively holding the locking lever 20 in either the locked or released positions, a spring-pressed toggle member 23 is arranged to cooperate with said lever 20 in such arrangement that in moving the latter into either its locked or released positions, said toggle member 23 must be pivoted across a dead centre, to be held in the said position until the spring controlling the toggle member is overborne by superior force applied in the opposite direction when the next releasing or locking operation is performed.

What I claim as my invention and desire to secure by Letters Patent is:

1. A locking cleat comprising a frame, a locking lever, an operating lever, an abutment adjacent said locking lever, apertures provided in opposite portions of said frame and positioned to permit passing a rope through said cleat between said abutment and the distal end of said locking lever, said levers being mechanically inter-connected and pivoted to said frame, a spring pressed toggle member pivoted at one end to said frame and at the other end to said locking lever and positioned relative to said locking lever to restrain said lever in locked or unlocked position on either side of dead center, the distal end of said locking lever being arranged and adapted to co-operate with said abutment to grip a rope passing through said cleat between said lever and said abutment when said lever is restrained in its locked position.

2. The locking cleat set forth in claim 1 in which the operating lever comprises a fair-lead adapted to receive a rope passing through said cleat between said abutment and the distal end of said locking lever, whereby the operating lever may be moved into locked or unlocked position by movement of the free end of the rope.

GEOFFREY NICOLAS ERNEST
TINDAL-CARILL-WORSLEY.

REFERENCES CITED

The following references are of record in the file of this patent:

UNITED STATES PATENTS

| Number | Name | Date |
| --- | --- | --- |
| 415,169 | Holder | Nov. 12, 1889 |
| 702,165 | Tryon | June 10, 1902 |
| 785,358 | Gutenkunst | Mar. 21, 1905 |
| 892,258 | Hosack | June 30, 1908 |
| 892,896 | Rowland | July 7, 1908 |
| 1,346,696 | Bergeron | July 13, 1920 |
| 1,709,910 | Gray | Apr. 23, 1929 |
| 1,710,697 | Gilbert | Apr. 30, 1929 |
| 2,010,286 | Wiener | Aug. 6, 1935 |
| 2,439,456 | Didge | Apr. 13, 1948 |

FOREIGN PATENTS

| Number | Country | Date |
| --- | --- | --- |
| 14,340 | Great Britain | June 25, 1904 |